(12) United States Patent
Vigilant

(10) Patent No.: US 8,639,944 B2
(45) Date of Patent: Jan. 28, 2014

(54) ZERO DIVISORS PROTECTING EXPONENTIATION

(75) Inventor: David Vigilant, Meudon (FR)

(73) Assignee: Gemalto SA, Meudon (FR)

( * ) Notice: Subject to any disclaimer, the term of this patent is extended or adjusted under 35 U.S.C. 154(b) by 315 days.

(21) Appl. No.: 13/057,703

(22) PCT Filed: Jul. 30, 2009

(86) PCT No.: PCT/EP2009/059867
§ 371 (c)(1),
(2), (4) Date: Feb. 4, 2011

(87) PCT Pub. No.: WO2010/015562
PCT Pub. Date: Feb. 11, 2010

(65) Prior Publication Data
US 2011/0131424 A1    Jun. 2, 2011

(30) Foreign Application Priority Data

Aug. 6, 2008    (EP) .................................... 08305453

(51) Int. Cl.
*G06F 11/30* (2006.01)
*G06F 12/14* (2006.01)

(52) U.S. Cl.
USPC ...................................................... 713/189

(58) Field of Classification Search
USPC ...................................................... 713/189
See application file for complete search history.

(56) References Cited

U.S. PATENT DOCUMENTS

| | | | |
|---|---|---|---|
| 6,748,410 B1* | 6/2004 | Gressel et al. ................. | 708/491 |
| 7,194,633 B2* | 3/2007 | Kaiserswerth et al. ....... | 713/189 |
| 7,543,159 B2* | 6/2009 | Baentsch et al. .............. | 713/193 |
| 2003/0093684 A1* | 5/2003 | Kaiserswerth et al. ....... | 713/193 |
| 2006/0090081 A1* | 4/2006 | Baentsch et al. .............. | 713/189 |
| 2008/0222427 A1* | 9/2008 | Baentsch et al. .............. | 713/189 |
| 2009/0122980 A1* | 5/2009 | Ciet et al. ........................ | 380/30 |

OTHER PUBLICATIONS

Aumueller C. et al: "Fault Attacks on RSA With CRT: Concrete Results and Practical Countermeasures" Cryptographic Hardware and Embedded Systems. International Workshop, XX, XX, (Aug. 13, 2002), XP001160527.
Ciet and M Joye M: "Practical fault countermeasures for Chinese Remaindering based RSA (Extended Abstract)" Fault Diagnosis and Tolerance in Cryptography FDTC 05,,(Sep. 2, 2005) XP007906966.
Yen S-M et al: "Hardware Fault Attack on RSA With CRT Revisited" Lecture Notes in Computer Science, Springer Verlag, Berlin; DE, vol. 2587, (Nov. 28, 2002), XP001160549 ISSN: 0302-9743.
Chong Hee Kim et al: "Fault Attacks for CRT Based RSA: New Attacks, New Results, and New Countermeasures" Information Security Theory and Practices. Smart Cards, Mobile and Ubiquitous Computing Systems; [LNCS], Springer Berlin Heidelberg, vol. 4462, (May 9, 2007) XP019058003.
PCT/EP2009/059867 International Search Report, Jan. 21, 2010, European Patent Office, P.B. 5818 Patentlaan 2 NL—2280 HV Rijswijk, Whole Document.
PCT/EP2009/059867 Written Opinion of the International Searching Authority, Jan. 21, 2010, European Patent Office D-80298 Munich, Whole Document.

* cited by examiner

*Primary Examiner* — Kambiz Zand
*Assistant Examiner* — Stephen Sanders
(74) *Attorney, Agent, or Firm* — The Jansson Firm; Pehr B. Jansson

(57) ABSTRACT

The invention relates to a method and to an electronic device for securing the computation of a modular exponentiation $x = m^D \bmod N$ against invasive attacks. The invention comprises applying a mask to the message m, and after the modular exponentiation is carried out, in verifying that the exponentiation was not altered thanks to properties introduced by the mask.

12 Claims, 3 Drawing Sheets

---

Input: message $m$, key $(p, q, d_p, d_q, i_q)$

Output: signature $m^d \in \mathbb{Z}_N$ $S_p = m^{d_p} \bmod p$ $S_q = m^{d_q} \bmod q$ $S = S_q + q \cdot (i_q \cdot (S_p - S_q) \bmod p)$ return $(S)$

Input: message $m$, key $(p, q, d_p, d_q, i_q)$
Output: signature $m^d \in \mathbb{Z}_N$ $S_p = m^{d_p} \mod p$
$S_q = m^{d_q} \mod q$
$S = S_q + q \cdot (i_q \cdot (S_p - S_q) \mod p)$
return $(S)$

Figure 1

Input: message $m$, key $(p, q, d_p, d_q, i_q)$
32-bit prime integer $t$
Output: signature $m^d \in \mathbb{Z}_N$ $p' = pt$
$d'_p = d_p + random_1 \cdot (p - 1)$
$S'_p = m^{d'_p} \mod p'$
if $(p' \mod p \neq 0)$ or $(d'_p \mod (p-1) \neq d_p)$ then
   return (error)
end if $q' = qt$
$d'_q = d_q + random_2 \cdot (q - 1)$
$S'_q = m^{d'_q} \mod q'$
if $(q' \mod q \neq 0)$ or $(d'_q \mod (q-1) \neq d_q)$ then
   return (error)
end if $S_p = S'_p \mod p$
$S_q = S'_q \mod q$
$S = S_q + q \cdot (i_q \cdot (S_p - S_q) \mod p)$
if $(S - S'_p \neq 0 \mod p)$ or $(S - S'_q \neq 0 \mod q)$ then
   return (error)
end if $S_{pt} = S'_p \mod t$
$S_{qt} = S'_q \mod t$
$d_{pt} = d'_p \mod (t - 1)$
$d_{qt} = d'_q \mod (t - 1)$
if $S_{pt}^{d_{qt}} \equiv S_{qt}^{d_{pt}} \mod t$ then
   return $(S)$
else
   return (error)
end if

Figure 2

Input: message $m$, key $(p, q, d_p, d_q, i_q)$
32-bit random integer $r$
64-bit random integers $R_1, R_2, R_3$ and $R_4$
Output: signature $m^d \in \mathbb{Z}_N$ $p' = pr^2$, $m_p = m \bmod p'$
$i_{pr} = p^{-1} \bmod r^2$, $\beta_p = p i_{pr}$ and $\alpha_p = 1 - \beta_p \bmod p'$
$\hat{m}_p = \alpha_p m_p + \beta_p \cdot (1 + r) \bmod p'$
if $(\hat{m}_p \neq m \bmod p)$ then
    return (error)
end if
$d'_p = d_p + [R_1 \cdot (p - 1)]$
$S_{pr} = \hat{m}_p^{d'_p} \bmod p'$
if $(\beta_p S_{pr} \neq \beta_p \cdot (1 + d'_p r) \bmod p')$ or $(d'_p \neq d_p \bmod (p - 1))$ then
    return (error)
end if
$S'_p = S_{pr} - \beta_p \cdot (1 + d'_p r - R_3)$ $q' = qr^2$, $m_q = m \bmod q'$
$i_{qr} = q^{-1} \bmod r^2$, $\beta_q = q i_{qr}$ and $\alpha_q = 1 - \beta_q \bmod q'$
$\hat{m}_q = \alpha_q m_q + \beta_q \cdot (1 + r) \bmod q'$
if $(\hat{m}_q \neq m \bmod q)$ or $(m_p \bmod r^2 \neq m_q \bmod r^2)$ then
    return (error)
end if
$d'_q = d_q + [R_2 \cdot (q - 1)]$
$S_{qr} = \hat{m}_q^{d'_q} \bmod q'$
if $(\beta_q S_{qr} \neq \beta_q \cdot (1 + d'_q r) \bmod q')$ or $(d'_q \neq d_q \bmod (q - 1))$ then
    return (error)
end if
$S'_q = S_{qr} - \beta_q \cdot (1 + d'_q r - R_4)$ $S = S'_q + q \cdot (i_q \cdot (S'_p - S'_q) \bmod p')$
$N = pq$
if $(N \cdot [S - R_4 - q i_q \cdot (R_3 - R_4)] \neq 0 \bmod Nr^2)$ or $(q i_q \neq 1 \bmod p)$
then
    return (error)
end if
return $(S \bmod N)$

Figure 3

ZERO DIVISORS PROTECTING EXPONENTIATION

BACKGROUND OF THE INVENTION

The invention relates to a method for protecting the execution of a modular exponentiation against invasive attacks such as Bellcore attacks. The invention also relates to an electronic device, in particular a smart card, implementing such a method.

The invention relates more specifically to the protection of modular exponentiation used in the context of RSA-CRT systems. RSA was introduced in 1977 by Rivest, Shamir and Adleman (see "Rivest, R. L., Shamir, A., Adelman, L. M.: A method for obtaining digital signatures and public-key cryptosystems. Technical Report MIT/LCS/TM-82 (1977)", which describes RSA in straightforward mode). RSA use is extremely widespread (you typically use RSA any time you connect to a web site securely, any time you use your bank card, etc.).

In the so-called straightforward mode, (N,e) is the RSA public key and (N,d) the RSA private key such that N=p*q, where p and q are large prime integers, gcd((p−1),e)=gcd((q−1),e)=1 and d=$e^{-1}$ mod((p−1)*(q−1)). The RSA signature of a message m<N is given by S=$m^d$ mod N.

As the computing power of crypto-enabled architectures increases, RSA key sizes inflate overtime. 2K RSA (RSA using 2048 bit keys) is now a standard functionality. It is a strong constraint on embedded devices which processors typically have little RAM memory and run under a clock frequency of a few megahertz. RSA is more efficient in Chinese Remainder Theorem mode than in straightforward mode. The RSA-CRT domain is composed of an RSA public key (N,e) and an RSA private key (p,q,$d_p$,$d_q$,$i_q$) where N=p*q, p and q are large prime integers, gcd((p−1),e)= gcd((q−1),e)=1, $d_p$=$e^{-1}$ mod(p−1), $d_q$=$e^{-1}$ mod(q−1) and $i_q$=$q^{-1}$ mod p. As it handles data with half the RSA modulus size, RSA with CRT is theoretically about four times faster and is therefore better suited to embedded devices. A naive CRT implementation of RSA signature in CRT mode is described in FIG. 1.

Invasive attacks on a hardware device typically consist in disturbing the expected behavior of the device and making it work abnormally in order to infer sensitive data. Such attacks were introduced in the late nineties. They are a serious concern, because they could lead an attacker to recover key material stored in cryptographic devices such as smart cards, HSMs, etc., which are normally considered secure. This would allow the attacker to impersonate the legitimate user (e.g. perform financial transactions from his bank account, use his phone line, carry out illegal activities in his name, etc.). In the past such attacks were not perceived as critical for personal computers since there are typically plenty of easier ways to crack a computer with pure software means, without the burden of an invasive attack. However, due to growing fraud, and with the emergence of components such as TPMs (trusted platform modules, which specifications are managed by the Trusted Computing Group), this could change. TPMs are meant to introduce secure cryptographic features in possibly all sorts of products (PDAs, printers, cell phones, etc.), are more and more common especially in corporate PCs, but also in all sorts of electronic equipments. So invasive attacks now become a threat to a lot more devices than before, and not only for cryptographic devices or high security computers (e.g. sensitive servers). As the technological response of hardware manufacturers evolves, new hardware countermeasures are being added regularly. However it is widely believed that those can only be effective if combined with efficient software countermeasures. Embedded devices are especially exposed to this category of attacks when the attacker has the hardware fully available in hands. A typical example of invasive attack is the original Bellcore attack which allows an attacker to retrieve the RSA private key given one faulty signature.

The Bellcore attack is a differential fault attack introduced by the Bellcore Institute In 1996. It is described in "Boneh, D., DeMillo, R. A., Lipton, R. J.: On the importance of checking cryptographic protocols for faults. Lecture Notes in Computer Science 1233 (1997) 37-51". On embedded platforms, this attack is usually considered as "easy" since the attacker has full access to the device. Disturbing the calculation of either $S_p$=$m^{dp}$ mod p or $S_q$=$m^{dq}$ mod q (steps illustrated on FIG. 1) can be achieved in ways such as voltage glitches, laser or temperature variation. Once the precise disturbance is obtained the attack succeeds, and allows an attacker to retrieve the RSA prime factors with a single gcd calculation. Indeed, by construction, S=$S_q$+q*($i_q$*($S_p$−$S_q$)mod p)=$S_p$+p* ($i_p$*($S_q$−$S_p$)mod q). Noting S the correct signature and S' the faulty signature where either $S_p$ or $S_q$ (but not both) is incorrect for the same input message, gcd(S-S',N) is either q or p. A standard improvement of the Bellcore attack is described in "Joye, M., Lenstra, A. K., Quisquater, J. J.: Chinese remaindering based cryptosystems in the presence of faults. Journal of Cryptology: the journal of the International Association for Cryptologic Research 12(4) (1999) 241-245" and leads to retrieving the factorization of N without the genuine signature by calculating gcd(($S'^e$−m) mod N,N) which is either p or q. Thus, the RSA private elements p and q are recovered and, as a consequence, the whole RSA-CRT private key is recovered.

Fault attacks as introduced by Bellcore are still a major threat toward cryptographic products implementing modular exponentiation, e.g. for the purpose of RSA signatures. When the public exponent is known, it is possible to verify the signature before outputting it, thereby preventing Bellcore attacks. However, most often on embedded devices, the public exponent is unknown, turning resistance to fault attacks into an intricate problem.

Since the discovery of the Bellcore attack, countermeasures have been proposed by the research community. In 1997, Shamir proposed an elegant countermeasure (described in "Shamir, A.: Method and apparatus for protecting public key schemes from timing and fault attacks", U.S. Pat. No. 5,991,415, November 1999, also presented at the rump session of EUROCRYPT '97) assuming that the private exponent d is known when running an RSA signature generation in CRT mode. In practice, however, this parameter is hardly available. CRT secure implementations of RSA were also proposed:

in 2002 by Aumüller et al. (Aumüller, C., Bier, P., Fischer, W., Hofreiter, P., Seifert, J. P.: Fault attacks on rsa with crt: Concrete results and practical countermeasures. In B. S. Kaliski Jr., c. K., Paar, C., eds.: Cryptographic Hardware and Embedded Systems—CHES 2002. Volume 2523 of Lecture Notes in Computer Science. (2002) 260-275)

in 2003 by Blömer et al. (Blömer, J., Otto, M., Seifert, J. P.: A new crt-rsa algorithm secure against bellcore attacks. In: CCS '03: Proceedings of the 10th ACM conference on Computer and communications security, New York, N.Y., USA, ACM (2003) 311-320), in 2005 by Joye and Ciet (Joye, M., Ciet, M.: Practical fault countermeasures for chinese remaindering based rsa. In Breveglieri, L., Koren, I., eds.: 2nd Workshop on Fault Diagnosis and Tolerance in Cryptography—FDTC 2005. (2005))

in 2005 by Giraud (Giraud, C: Fault resistant rsa implementation. In Breveglieri, L., Koren, I., eds.: 2nd Workshop on Fault Diagnosis and Tolerance in Cryptography—FDTC 2005. (2005) 142-151), and in 2007 by Kim and Quisquater (Kim, C. H., Quisquater, J. J.: How can we overcome both side channel analysis and fault attacks on rsa-crt? In Breveglieri, L., Gueron, S., Koren, I., Naccache, D., Seifert, J. P., eds.: FDTC. (2007) 21-29)

These countermeasures will be discussed more in details in the sequel. All these countermeasures have a dramatic impact either on execution time, memory consumption or personalization management constraints.

The elegant countermeasure proposed by Shamir one year after the discovery of the Bellcoreattack, consists in computing $S^*_p = m^d$ mod pr and $S^*_q = m^d$ mod qr separately and in checking the consistency of $S^*_p$ and $S^*_q$ by testing whether $S^*_p = S^*_q$ mod r. A more efficient variant suggests to choose r prime and reduce d modulo (p−1)(r−1) and (q−1)(r−1). However, requiring the RSA straightforward-mode private exponent d, while performing an RSA signature generation in CRT mode, is typically unpractical for resource constrained devices since the key material is typically given in CRT format only (as will be seen further). This parameter d is most often not known and it is often unacceptable to personalize d for each constrained device, d could be computed from p, q, $d_p$ and $d_q$, but as no key container is typically available to store it, the computation of d would be mandatory for each RSA signature. This would lead to an unreasonable execution time overhead since one would need to invert (p−1) modulo (q−1), as described in particular in Joye, M., Paillier, P.: Gcd-free algorithms for computing modular inverses. In B. S. Kaliski Jr., c. K., Paar, C, eds.: CHES. (2003) 243-253. Moreover, the CRT recombination is not protected at all since injecting a fault in $i_q$ during the recombination allows the gcd attack.

Other improvements of Shamir's method which include the protection of the recombination were proposed later. As an example, in above mentioned reference, Aumüller et al proposed in 2002 a careful implementation that also protects the CRT recombination. Aumüller et al use a small prime on which evaluating Euler's totient function is trivial. On the one hand, this countermeasure gives good performances. On the other hand, the selection of a random prime constitutes a real disadvantage. As opposed to Shamir's method, only $d_p$ and $d_q$ (and not d) are required. The algorithm is fully described in FIG. 2. The proposal uses the efficient variant of the method where the parameter t is prime. Therefore the solution gives good performances. Compared to the naive CRT implementation of RSA, only two extra exponentiations modulo t and a few modular reductions are required. But this solution presents a big disadvantage linked to the way in which the random prime is selected. If it is fixed or picked at random in a fixed table, then if this prime is recovered, it could make new flaws appear. If it is different on each device, this would impact personalization management. If it is generated at random for each signature, this would lead to an unacceptable slowdown.

Other solutions combining generalizations of Shamir's method and infective computation were proposed. The main idea of this combination consists in infecting the signature S whenever a fault is induced, such that the gcd attack is no more feasible on the faulty signature S', i.e. S'≠S mod p and S'≠S mod q. This concept was introduced in 2001 by Yen, Kim, Lim and Moon (Yen, S. M., Kim, S., Lim, S., Moon, S.: Rsa speedup with residue number system immune against hardware fault cryptanalysis. In: ICISC '01: Proceedings of the 4th International Conference Seoul on Information Security and Cryptology, London, UK, Springer-Verlag (2002) 397-413). Later, Blömer, Otto and Seifert suggested a countermeasure (already mentioned above) based on infective computation in 2003. Unfortunately, as for Shamir's original method, it requires the availability of d. Moreover, some parameters $t_1$ and $t_2$ required by the countermeasure have to satisfy quite strong properties: amongst the required properties, it is needed that: $\gcd(t_1,t_2) = \gcd(d,\phi(t_1)) = \gcd(d,\phi(t_2)) = 1$, where phi represents the Euler's totient function, $t_1$ and $t_2$ should normally be generated one time with the RSA key and the same values used throughout the lifetime of the key, but $t_1$ and $t_2$ typically cannot be stored in a context where there are strong personalization constraints. Therefore the generation of $t_1$ and $t_2$ at each signature is not negligible. Compared to Aumüller et al.'s countermeasure, the BOS algorithm requires the generation of $t_1$ and $t_2$, two evaluations of the totient function phi on $t_1$ and $t_2$ and two inversions. This constitutes a real disadvantage in terms of simplicity and execution time.

Joye and Ciet also set out an elegant countermeasure based on infective computation (C.F. reference above). Their generalization of Shamir's method is more efficient than BOS since, compared to Aumüller et al.'s countermeasure, one only needs to compute $phi(t_1)$ and $phi(t_2)$ for two random numbers $t_1$ and $t_2$. However, evaluations are not negligible as they imply a full factorization of $t_1$ and $t_2$. As a consequence, Joye and Ciet's countermeasure is not satisfactory in terms of execution time.

In 2007, Kim and Quisquater proposed a CRT implementation of RSA defeating fault attacks and all known side-channel attacks (see reference above), based on combination of Shamir's method and infective computation too. However, their proposed scheme requires either one inversion modulo N, or to update and store three unusually formatted parameters of size |N|, at each signature. Unfortunately, no key container for such parameters is typically available in non-volatile memory of typical resource constrained devices and therefore, the parameter must typically be computed every time, and this solution becomes hardly acceptable in terms of execution time.

In 2005, Giraud proposed an efficient way to protect RSA with CRT against fault attacks (see reference above). His countermeasure is based on the properties of the Montgomery-ladder exponentiation algorithm described in particular in Joye, M., Yen, S.: The montgomery powering ladder. In B. S. Kaliski Jr., c. K., Paar, C., eds.: Cryptographic Hardware and Embedded Systems—CHES 2002. Volume 2523 of Lecture Notes in Computer Science. (2002) 291-302. Using this exponentiation algorithm, Giraud suggests to compute successively $(m^{d_p}, m^{d_p-1})$ and $(m^{d_q}, m^{d_q-1})$. The Montgomery-Ladder algorithm infects both results whenever a fault is induced. The two recombined values S and $S' = m^{d_q-1} + q \cdot (i_q \cdot (m^{d_p-1} - m^{d_q-1}) \bmod p)$ are computed and the final verification S=mS' is made. This solution is also SPA-safe. Unfortunately, the memory consumption is clearly prohibitive since it requires the storage of m, $S_p$, $S_q$, $S'_p$ and $S'_q$ in RAM during the calculation of S. For large RSA key sizes, this countermeasure seems hardly feasible in portable devices with limited resources.

Over the past few years, several techniques for secure implementations have therefore been published, all of which suffering from inadequacy with the constraints faced by certain embedded platforms.

Indeed, in constrained embedded architectures, one typically seeks to simultaneously optimize at least the following:

Execution time

The secure RSA-CRT signature computation has to be performed in reasonable time. Without giving concrete bounds, the time overhead added by the countermeasure should remain as small as possible compared to the whole RSA signature calculation. This is quite important in particular for micro-controllers running under a clock frequency of only a few megahertz.

Memory consumption

Countermeasures require extra RAM memory buffers to store security parameters. 2K RSA is generally supported as a standard functionality and it is preferred that the whole memory consumption remains comprised between 1 Kb and 2 Kb (kilo bytes) for current devices, especially the less powerful ones (e.g. low end smart cards).

Personalization management

For constrained device such as smart cards which are deployed by millions, and where each smart card is different, personalization is the task which consists in loading the relevant (and typically different) information in each smart card (card holder name, bank account numbers, specific data, etc.). In many fields, some personalization aspects are standardized, either by official bodies or de facto. E.G. The file system of a SIM card used in mobile telephony is highly standardized in order to guarantee an acceptable level of interoperability (almost any SIM card should word in almost any cell phone). Such standardization often concern among other things, the way in which cryptographic material is stored in the constrained device. Availability of input key parameters is therefore a very strict constraint. Quite often, for RSA operations, only the input message m, as well as the CRT decomposition comprising key elements p, q, dp, dq, iq are known while performing an RSA signature and no extra variable parameter can be stored in non-volatile memory if one wishes to remain compliant with standards. This constraint also stems from mass-production requirements where the personalization of unusually formatted keys in the device is costly and no customizable key container is therefore typically available in non volatile memory (e.g. EEPROM or Flash) to store anything different from the classical RSA-CRT keysets, an example of which is described in "Sun Microsystems Inc.: Javacard 2.2.2—application programming interface. Technical report (2006)". Other types of key sets can be available in non Java environment (e.g. proprietary OS, .NET OS, etc.), but they typically have the same kind of constraints.

Code Size

On micro-controllers that have little storage space for executable code (typically ROM, or flash), the code size is a great concern. The extra code size added by a countermeasure should remain as small as possible compared to the whole code size of the cryptographic operation (typically a signature) protected by the counter measure.

This shows that devising a CRT implementation of RSA that thwarts the Bellcore attack and meets the strong requirements of embedded systems remains a hard problem, which specialists have been trying to solve for more than ten years without success.

It is therefore an object of the invention to find a countermeasure allowing to securely compute modular exponentiations (and in particular RSA signatures), which is adapted to resource constrained device. Such countermeasure is of course very well adapted to more powerful devices as well, since even when you have plenty of resources, you typically don't want to waste them uselessly.

BRIEF DESCRIPTION OF THE DRAWINGS

The invention and its advantages will be explained more in details in the following specification referring to the appended drawings, in which FIG. 1 represents a naive CRT implementation of RSA, FIG. 2 represents a CRT implementation of RSA according to Aumüller et al., and FIG. 3 represents a preferred embodiment of the invention.

DETAILED DESCRIPTION

In a method according to a preferred embodiment of the invention, a modular exponentiation $x = m^D \bmod N$ is computed, wherein m is a message, D is an exponent, and N is a modulus. As known in the art, the message m should be less than the modulus N. The modular exponentiation can be computed in any integer ring $(\mathbb{Z}_N, +, \cdot)$ where $N \in \mathbb{N}^+$. The modular exponentiation can be used for any cryptosystem requiring exponentiations in rings or finite fields of integers, in particular:

Diffie-Hellman key exchange (Diffie, W., Hellman, M. E.: New directions in cryptography. IEEE Transactions on Information Theory IT-22(6) (1976) 644-654), El Gamal decryption (El Gamal, T.: A public-key cryptosystem and a signature scheme based on discrete logarithms. In: CRYPTO. (1984) 10-18), RSA in straightforward mode, Schnorr (Schnorr, C. P.: Efficient signature generation by smart cards. Journal of Cryptology 4(3) (1991) 161-174), DSA (National Institute of Standards and Technology: Digital Standard Signature. Federal Information Processing Standards Publications 186 (1994)), KCDSA (Lim, Lee: A study on the proposed korean digital signature algorithm. In: ASIACRYPT: Advances in Cryptology—ASIACRYPT: International Conference on the Theory and Application of Cryptology, LNCS, Springer-Verlag (1998) 175-186), and so forth.

However, it is especially relevant in the case of RSA with CRT.

Two parameters are used, namely an integer k, and an integer R such that R and N are coprime. Both k and R are preferably much smaller than N. For example R can be 32 bits or 64 bits long while N could be for example 1024 bits long. The integers k and R can be set to any value, except that R should be coprime with N. In many cases, if R is much shorter than N, then N and R are necessarily coprime, so any R can be picked without having to test the primality. For example, in the case of RSA, N is the product of two big prime numbers which are approximately half the size of N. Therefore, R cannot be equal to any of the primes (since R is too short), and therefore R is necessarily coprime with each prime number (by definition of primality), consequently R is also coprime with N. When it is not possible to know in advance whether R is coprime with N, it is possible to use a coprimality test. Many primality tests are known in the art e.g. the Fermat test, Miller-Rabin test, Solovay-Strassen test, etc. however it is more efficient to use a coprimality test. A coprimality test is a test verifying whether the gcd (greatest common divisor) of two numbers is equal to one. There are several methods calculating the gcd of two numbers for example Euclidian and binary Euclidian methods. Such tests can be used to determine whether R and N are coprime, and if they are not, the parameter R should be changed until it is coprime with N. In order to change R it is possible to rely on one of the techniques typically used for prime number generation (applied in particular when creating RSA key pairs). E.G. a new R can be picked at random, or a new R can be computed from the previous R e.g. by a function R=f(R). Examples of very simple functions f include the following. If R was even, add or subtract one or any odd number to/from R. If R was odd, add or subtract two (or add or subtract any even number) to/from R. The simplest method would be to make sure R is odd (if it's not add one) and then to add two until the coprimality test is met with N and the newly computed R.

The computation of the modular exponentiation is secured against invasive attacks by implementing the following steps.
  a. generate a mask alpha and a mask beta, such that alpha=1 mod N, alpha=0 mod R, beta=0 mod N and beta=1 mod R. The above properties of the mask alpha are designed to allow detection of tampering with the message m with a high probability. The above properties of the mask beta are designed to allow detection of tampering with the exponent D with a high probability.
  b. mask the message m with the masks alpha and beta by computing a masked message m'=(m*alpha+k*beta) mod (N*R).
  c. compute the modular exponentiation x'=m'$^D$ mod (N*R)
  d. if (x'-k$^D$) mod R=0, output x=x' mod N, otherwise apply a countermeasure. If (x'-k$^D$) mod R≠0, then an invasive attack must have occurred at some point, because the masks have been designed in order for the property (x'-k$^D$) mod R=0 to be verified. In addition, there's a very high probability that if any invasive attack occurs, the property is no longer verified, because it would be very hard to alter the value of x' while preserving this property. Therefore, if (x'-k$^D$) mod R=0, then most likely there was no attack, and the method can output the expected result of the exponentiation, which is equal to x=x' mod N, otherwise it should apply a countermeasure in response to the detected attack.

In a simplified version of this first embodiment, the integer k is equal to zero, which means that it is not necessary to compute a mask beta, and that the above steps are simpler. This technique is simpler to implement, requires less memory, and is a bit faster, however, the probability to detect an invasive attack is a bit lower, in particular if the attack affects only the exponent D. The simplified method therefore comprises the following steps:
  a. generate a mask alpha such that alpha=1 mod N and alpha=0 mod R,
  b. mask the message m with the mask alpha by computing a masked message m'=(m*alpha) mod (N*R),
  c. compute the modular exponentiation x'=m'$^D$ mod (N*R)
  d. if x' mod R=0, output x=x' mod N, otherwise apply a countermeasure In a method according to a third preferred embodiment, which corresponds the method according to one of the previous two embodiments, alpha is computed with the formula alpha=(1−N*((1/N) mod R)) mod (N*R). Of course, other values could be used, e.g. by adding a multiple of N*R.

In a fourth preferred embodiment, the above embodiments which make use of a mask beta compute beta with the formula beta=(N*((1/N) mod R)) mod (N*R). Similarly, other values are possible for beta (e.g. add any multiple of N*R).

In a fifth preferred embodiment, the previous embodiments are improved, as follows. Before carrying out the modular exponentiation x'=m'$^D$ mod (N*R), it is verified that m=m' mod N, and if this is not the case, a countermeasure is applied. It would also be possible to verify a second time that m=m' mod N after the modular exponentiation. It is advantageous to verify that m=m' mod N before the modular exponentiation in order to not carry out the modular exponentiation if it is known that an attack has occurred (this could leak some information, even if the output is not given using the normal output means thanks to the countermeasure). It could also make sense to verify a second time (as stated above) after modular exponentiation, in order to minimize the chance that an attack remains unnoticed (unlikely situation where the hacker would manage to change m' during the modular exponentiation and somehow manage to skip the test (x'-k$^D$) mod R=0 or otherwise manage to have this test (x'-k$^D$) mod R=0 properly verified, e.g. by invasive attack). If m≠m' mod N, then an attack must have occurred during or after the masking of the message. By construction, the original message m should be equal to the masked message m' modulo N (whether a single mask alpha or both masks alpha and beta are used). If this equality is not verified, there must have been an attack (e.g. causing a malfunction during the masking operation). It would be very hard for a hacker to disrupt the operations in such a manner that the value of the masked message m' be changed, but at the same time that the changed original message m still be equal to the masked message m' modulo N, so there's a high likelihood that the attack would be detected.

In a sixth preferred embodiment, the countermeasure(s) of the previous embodiments comprise(s) not outputting any result for the required modular exponentiation. Instead, it is possible, for example, to output an error status. This is advantageous, because the hacker cannot easily carry out any analysis on the tampered output (since there's no output), and he cannot infer much useful information from the error status, since he already knows that he generated an error (as he's trying to hack the method). The only information he obtains is the fact that the method detected his attack. Alternatively, it would be possible, for example, to output a random result. In this way, the hacker would not even know whether his attack was detected or not, unless he's able to find out that some mathematical properties should have been met on the expected forged output and are not met on the random output, however, it would be very difficult for him to trace back this unexpected result to a countermeasure inside the method rather than to a failure in his attack. In preferred embodiments, the detection of the invasive attack can trigger other countermeasures, such as the counting of the number of invasive attacks, and the blocking of the entity computing the modular exponentiation after the counter has reached a predetermined threshold. The threshold could be 1, i.e. as soon as an attack is detected, the entity is blocked. The countermeasure could also comprise logging and/or reporting means in order to inform relevant entities that an attack occurred. The countermeasure for detecting tampering (in particular tampering with the masked message, or with the exponent, or both) during or after the modular exponentiation, as well as the additional countermeasure for detecting tampering with the masking of the message (added in preferred embodiments in order to see whether the message was altered before being masked, or during its masking, or whether the masked message was altered before the modular exponentiation is completed) can be the same counter measure. Alternatively, it is possible for example to log whether the attack was detected during the masking of the message, or at a later stage, e.g. during the modular exponentiation.

In a seventh preferred embodiment, the above mentioned embodiments are improved by using a random number for the integer R. R is preferably generated with a very high quality random number generator (RNG). Such high quality RNGs typically rely on hardware means (such as sampling of noise within the chip, etc.), and on post processing of the seed obtained from a hardware source (the post processing can typically be done in software). It is possible to first generate an intermediate random number with a high quality RNG, and then to process this intermediate random number to obtain the random number R (e.g. the intermediate random number can go through a crypto-processor in order to further improve its statistical properties).

In an eighth preferred embodiment, the seventh embodiment is improved by generating a new random number R for each modular exponentiation. This is advantageous because it makes the analysis of the method harder (a hacker would never see the same parameter R, which makes reverse engineering more complex).

In a ninth embodiment, the previous embodiments (except the second one, which does not involve a parameter k) are improved as follows. Another parameter, consisting of an integer i, is used. The integer i is preferably equal to 2, but could be greater. It is preferably a relatively small number. The integer R is obtained by raising an integer r to the power i, so that $R=r^i$. The integer r can have any value such that $gcd(N, r^i)=gcd(N, r)=1$ i.e. N and r are coprime. The length of r should preferably be greater than the expected length of R divided by i (e.g. if R is expected to have 64 bits, and i=4, then r should preferably be at least 16 bits long). It is not useful for r to be longer than the expected length of R divided by i, but it could be longer. R could then be shrinked to the expected length afterwards (e.g. with a modulo). If the integer R is, according to the seventh or eighth preferred embodiment, a random number, r is preferably obtained with a high quality RNG, and then raising r to the power i is a form of post processing (described above), therefore it can be considered that R is a random number obtained from a high quality RNG. However, R exhibits some properties (as it has a $i^{th}$ root), so maybe it should not be considered as random as r itself, however at that stage no attack relying on such property of R are envisaged. If $r^i$ is not prime with N, then it is possible to pick another r at random until the condition is met (but as stated above, the simple fact that R is short makes R prime with N in many instances, e.g. for RSA). The integer k is set to the value k=1+r. This is very advantageous because it allows speeding up the computation of $k^D$ which could otherwise be pretty long. Indeed, $$(1+r)^D = \sum_{t=0}^{D}\binom{D}{t}r^t,$$

and since the result is computed modulo R, that is modulo $r^i$, all elements in the sum which power is greater than i−1 are equal to zero modulo R. Therefore, $$(1+r)^D = \sum_{t=0}^{i-1}\binom{D}{t}r^t \bmod R.$$

In particular, in a preferred embodiment, i=2, and $(1+r)^D=(1+D*r)$ mod R, therefore it can be trivially and very quickly computed. It is also possible to use any other value for i, bearing in mind that for a smaller i, the computation is faster.

In a variant, a tenth improved method is proposed, wherein the method according to any one of the first, third, fourth, fifth, sixth, seventh or ninth embodiments (when the ninth embodiment is not carried out according to the eighth embodiment), is improved by reusing the number R and the integer k for several modular exponentiations (e.g. the next 32 modular exponentiations to be invoked with the modulus N and the exponent D concerned), or even for all modular exponentiations to be carried out by the method with the private exponent D and with the modulus N concerned. The method could be dealing with several sets of parameters for the modular exponentiations. E.G. this would be the case if several RSA keys were available, and depending on which key is used for an RSA signature operation, different parameters N and D would be used (e.g. signature with an RSA key associated with a qualified or advanced X.509 certificate for important matters, or signature with a key associated with a lower quality X.509 certificate for not so important daily matters). In such case, it could be decided that even for different parameters (e.g. N and D), the same R and k would be used. Alternatively, different R and k could be used for different parameters (e.g. N and D), but for a given set of parameters (e.g. N and D), R and k would not be changed, or would be changed only once in a while. According to this improved version, the masks alpha and beta, as well as the value $k^D$ mod R, are pre-computed once for many modular exponentiations. This is advantageous because computing in particular $k^D$ mod R (but also alpha and beta) can be time consuming and by doing it in advance, the method performance is improved (in terms of execution speed). In case of RSA, it would be possible, just after generating the RSA key, which comprises N and D, to also compute R, k, $k^D$ mod R, alpha and beta, and then at the time of RSA signature, those parameters R, k, $k^D$ mod R, alpha and beta would simply need to be read from a memory and would not involve any computation. This embodiment is faster, but of course it is slightly less secure than generating a random R for each exponentiation, since by reusing the same material several times, an attack could become easier.

In preferred embodiments, the above methods also comprise internal masking operations with random numbers, such as random numbers $R_1$, $R_2$, $R_3$ and $R_4$ illustrated on FIG. 3.

A more detailed description of a preferred embodiment of the invention is described below.

We consider a generic exponentiation of a message m smaller than N to the exponent d modulo N. We perform the exponentiation modulo NR where R is for example a 64-bit random integer. We impose that N and R are coprime, i.e. gcd(N,R)=1. For RSA, this property is automatically verified for any random number as long as such random number is smaller than p and smaller than q, which is the case with a 64 bit random number.

Let $\alpha$ be such that $\begin{cases} \alpha \equiv 0 \bmod R \\ \alpha \equiv 1 \bmod N \end{cases}$ and $\beta$ be such that $\begin{cases} \beta \equiv 1 \bmod R \\ \beta \equiv 0 \bmod N \end{cases}$ Applying the Chinese Remainder Theorem, we get the existence and the uniqueness of $\alpha$ and $\beta$ in $\mathbb{Z}_{NR}$. We build these integers using Garner's algorithm:

$\alpha = R \cdot (R^{-1} \bmod N) = 1 - [N \cdot (N^{-1} \bmod R)] \bmod NR$ $\beta = N \cdot (N^{-1} \bmod R) = 1 - [R \cdot (R^{-1} \bmod N)] \bmod NR$ Considering R now such that $R=r^2$, where r is for example a 32-bit random number, we get the following result:

Theorem 1 (Exponentiation Identity in $\mathbb{Z}_{Nr^2}$). Let N and r be integers such that (N,r)=1, let $\beta = N \cdot (N^{-1} \bmod r^2)$ and $\alpha = 1 - \beta$ mod $Nr^2$. For any $m \in \mathbb{Z}_{Nr^2}$ and for any $d \in \mathbb{N}^+$, $(\alpha m + \beta \cdot (1+r))^d = \alpha m^d + \beta \cdot (1+dr) \bmod Nr^2$ We refer to Appendix A for a proof and related mathematical details. Theorem 1 provides a way to perform a secure exponentiation in any ring $(\mathbb{Z}_N, +, \cdot)$, $N \in \mathbb{N}^+$.

A Secure Exponentiation Algorithm

We want to perform an exponentiation $m^d$ of an integer $m<N$ over $\mathbb{Z}_N$. Pick a random integer $r$ coprime with $N$ and compote $\beta = N \cdot (N^{-1} \bmod r^2)$ and $\alpha = 1 - \beta \bmod Nr^2$. Applying Theorem 1, in order to exponentiate the element m and verify that no disturbance occurred, proceed as follows:
1. Compute $\hat{m} = \alpha m + \beta \cdot (1+r) \bmod Nr^2$
2. Verify that $\hat{m} = m \bmod N$ and in case of inequality return "error detected"
3. Compute $S_r = \hat{m}^d \bmod Nr^2$ and $S = S_r \bmod N (= m^d \bmod N)$
4. Verify that $S_r = \alpha S + \beta \cdot (1+dr) \bmod Nr^2$ and in case of inequality return "error detected"

By virtue of equalities $\beta = \beta^2$ and $\alpha\beta = 0$ in $\mathbb{Z}_{Nr^3}$ (by construction of $\alpha$ and $\beta$), the consistency of $S_r$ can also be verified by any one of the following checks:
1. $\beta S_r = \beta \cdot (1+dr) \bmod Nr^2$
2. $N \cdot (S_r - \beta \cdot (1+dr)) = 0 \bmod Nr^2$
3. $S_r = 1 + dr \bmod r^2$ The optimal choice will depend on the hardware architecture and the algorithmic context. This countermeasure may be applied to any cryptographic scheme based on exponentiation in $(\mathbb{Z}_N, +, \cdot)$, $N \in \mathbb{N}^+$ (RSA [9], Diffie-Hellman key exchange [14], ElGamal [15], . . . ). Here we underline its application to the CRT implementation of RSA, where it appears to be particularly relevant.

Application to RSA with CRT

As p and q are prime, r is automatically coprime with p and q, we define: $\beta_p = p \cdot (p^{-1} \bmod r^2)$, $\alpha_p = 1 - \beta_p \bmod pr^2$, $\beta_q = q \cdot (q^{-1} \bmod r^2)$ and $\alpha_q = 1 - \beta_q \bmod qr^3$. FIG. 3 shows a possible application of our countermeasure to RSA with CRT. Exponentiations $S_{pr}$ and $S_{qr}$ are performed over $\mathbb{Z}_{pr^2}$ and $\mathbb{Z}_{qr^2}$. We verify that each exponentiation has not been disturbed by checking:

$$\beta_p S_{pr} = \beta_p \cdot (1+d'_p r) \bmod pr^2 \text{ and } \beta_q S_{qr} = \beta_q \cdot (1+d'_q r) \bmod qr^2.$$

We pick up two 64-bit random integers $R_3$ and $R_4$. We then transform:

$$S_{pr} \text{ into } S'_p \text{ s.t. } \begin{cases} S'_p \equiv S_p \bmod p \\ S'_p \equiv R_3 \bmod r^2 \end{cases} \text{ and } S_{qr} \text{ into } S'_q \text{ s.t. } \begin{cases} S'_q \equiv S_q \bmod q \\ S'_q \equiv R_4 \bmod r^2 \end{cases}$$

Next, the resulting signature is recombined over $\mathbb{Z}_{Nr^2}$:

$$S = S'_q + q \cdot [i_q \cdot (S'_p - S'_q) \bmod pr^2].$$

and, we perform the final consistency check:

$$S = R_4 + q i_q \cdot (R_3 - R_4) \bmod r^2.$$

If all verifications are positive, we return the result $S \bmod N$.

It is recommended to verify the quality of the random number generator. It is also recommended to chose r such that $i_q \neq 0 \bmod r$. Indeed if r divides $i_q$, the fault detection probability is reduced since the verification $N^*[S-R_4-q^*i_q^* (R_3-R_4)]=0 \bmod (N^*r^2)$ is true even though the result of $(S_p-S_q) \bmod (p^*r^2)$ or q has been modified. So we recommend to renew the generation of the random r while r divides $i_q$. The random r should be as large as possible within the limits of the hardware architecture, and bearing in mind that it should preferably be small compared to N. Since we can see r as a security parameter, the larger it is, the higher the fault detection probability. Indeed, the highest success probability of an attack is $2^{-(|r|-1)} \ln 2$ (see below, and Appendix B for more details). So we suggest that r should be at least a 32-bit random integer. Finally, we preferably choose r with most significant bit equal to one, in order to optimize the security level. We also preferably choose r odd in order to optimize the efficiency of the inversion.

The invention also relates to an electronic device, arranged to compute a modular exponentiation $x = m^D \bmod N$, wherein m is a message, D is an exponent, and N is a modulus. The device is set to protect the modular exponentiation against invasive attacks, by comprising:
- a. means for generating a mask alpha and a mask beta, such that alpha=1 mod N, alpha=0 mod R, beta=0 mod N and beta=1 mod R,
- b. means for masking the message m with the masks alpha and beta by computing a masked message m'= (m*alpha+k*beta) mod (N*R),
- a. means for computing the modular exponentiation $x' = m'^D \bmod (N*R)$
- b. means for checking whether $(x'-k^D) \bmod R = 0$, and, if this condition is verified, outputting $x = x' \bmod N$, otherwise, applying a countermeasure given an integer k and an integer R such that R and N are coprime.

The electronic device can be a personal computer, a server, a phone, a PDA, etc. In preferred embodiments, the electronic device is a security device; in particular it can be a smart card, an HSM, a USB key, or any form of cryptographic token.

The device preferably implements the method according to the invention. All variants described above for the method apply equally to the device.

In the sequel, we provide an analysis of the resistance against fault attacks, a side channel analysis, and a performance analysis for the preferred embodiment of FIG. 3.

We then provide in appendix A and B the demonstration of some of the theorems and properties used in the invention.

Resistance Against Fault Attacks

The following fault model defines what an attacker is able to do by assumption. By disturbing the device, we mean, that an attacker can:
- modify a value in memory obtaining a totally random result uncorrelated to the original value (as known as permanent fault);
- modify a value when it is handled in local registers, without modifying the global value in memory. The value handled obtained is fully random looking to the attacker and uncorrelated to the original value (as known as transient fault);

The design does not address attackers who can:
- modify the code execution. Processor instructions cannot be replaced or removed while executing code. Such an attacker might have the power to dump EEPROM and obtain the secret key;
- inject a permanent fault in the input elements, the message m as well as the key (p, q, $d_p$, $d_q$, $i_q$). We suppose that input elements are given along with an integrity value that can be verified whenever during the signature;
- Change the Boolean result of a conditional check. An expression "if a=b" has a result true or false that cannot be modified. We made here a compromise on the level of security. Indeed, contrary to some other methods based on infective computations, our design uses conditional checks. However it would be possible to replace these checks by unconditional infections of the computation.

We consider the CRT implementation of RSA described in FIG. 3 and we assume the recommendations discussed in Section 3.4 have been followed. Noting $|\alpha|$ the bit size of $\alpha$ and $\alpha$ the faulty value of $\alpha$, let us review some fault scenarios and identify the associated success probabilities (probabilities are more detailed in Appendix B):

Modifying p or r in a transient way during the calculation of p' or modifying p' in a permanent way before the check of $\hat{m}_p$ same holds for q'):

$$Pr[\hat{m}_p \approx m \bmod p] \approx 2^{-(|p|-1)} \ln 2$$

After the check of $\hat{m}_p$, if the permanent fault occurs only during the exponentiation:

$$Pr[\beta_p \underline{S_{pr}} = \beta_p \cdot (1+d'_p r) \bmod p'] \approx 2^{-(|p'|-1)} \ln 2$$

Modifying m in a transient way during the calculation of $\hat{m}_p$ or modifying $\hat{m}_p$ in a permanent way before the check (The same holds for $\hat{m}_q$):

$$Pr[\hat{\underline{m}}_p = m \bmod p] \approx 2^{-(|p|-2)} \ln 2$$

Modifying m in a permanent way after the first exponentiation (we may also consider that m is associated with an integrity value that is verified):

$$Pr[\underline{m}_q \bmod r^2 = m_p \bmod r^2] \approx 2^{-(2|r|+1)}$$

If the permanent fault occurs after the check of $\hat{m}_p$:

$$Pr[\beta_p \underline{S_{pr}} = \beta_p \cdot (1+d'_p r) \bmod p'] = Pr[\hat{\underline{m}}_p = 1 + r \bmod r^2] \approx 2^{-2|r|+1}$$

Modifying p or $r^2$ in a transient way during the calculation of $i_{pr}$, or modifying $i_{pr}$ in a permanent way (The same holds for $i_{qr}$):

$$Pr[(\alpha_p m + \beta_p \cdot (1+r) = m \bmod p) \cap (\alpha_p m + \beta_p \cdot (1+r) = (1+r) \bmod r^2)] = 0$$

Modifying p or $i_{pr}$ in a transient way during the calculation of $\beta_p$ or modifying $\beta_p$ in a permanent way (The same holds for $\beta_q$):

$$Pr[\alpha_p m + \beta_p \cdot (1+r) = m \bmod p) \cap (\alpha_p m + \beta_p \cdot (1+r) = (1+r) \bmod r^2)] = 0$$

Modifying $\beta_p$ or p' in a transient way during the calculation of $\alpha_p$ or modifying $\alpha_p$ in a permanent way (The same holds for $\alpha_q$):

$$Pr[\beta_p \underline{S_{pr}} = \beta_p \cdot (1+d'_p r) \bmod p'] = Pr[\underline{\alpha}_p 0 \bmod r^2] \approx 2^{-2|r|+1}$$

Modifying (p−1) or $d_p$ in a transient way during the calculation of $d'_p$ or modifying $d'_p$ in a permanent way (The same holds for $d'_q$):

$$Pr[\underline{d}'_p = d_p \bmod (p-1)] \approx 2^{-(|p|-1)} \ln 2$$

Modifying $d'_p$ in a transient way during the computation of $S_{pr}$ (The same holds for $S_{qr}$):

$$Pr[\beta_p \underline{S_{pr}} = \beta_p \cdot (1+d'_p r) \bmod p'] = Pr[\underline{d}'_p = d'_p \bmod r] \approx 2^{-(|r|-1)} \ln 2$$

Modifying $d'_p$ or p' in a transient way during the computation of $S_{pr}$ (The same holds for $S_{qr}$):

$$Pr[\beta_p \underline{S_{pr}} \beta_p \cdot (1+d'_p r) \bmod p'] = Pr[\hat{\underline{m}}_p = 1+r \bmod r^2] \approx 2^{-2|r|+1}$$

Modifying $S_{pr}$, $\beta_p \cdot (1+d'_p r)$, $R_s$ or p' in a transient way during the computation of $S'_p$, or modifying $S'_p$ in a permanent way (The same holds for $S'_q$):

$$Pr[S-R_4-qi_q \cdot (R_3-R_4)=0 \bmod r^2] \approx 2^{2|r|+1}$$

Modifying $S'_p$, $S'_q$, p', $i_q$ or $S'_q$ in a transient way during the recombination:

$$Pr[N \cdot (S-R_r-qi_{q'} \cdot (R_S-R_4))=0 \bmod Nr^2] \approx 2^{-2|r|+1}$$

Side-Channel Analysis

Although side-channel analysis is not studied in this paper, the design should be combined with, adapted extra countermeasures against side-channel attacks.

Performance Analysis

Execution Time

The most expensive steps are the two inversions. They are performed on parameters with length twice the length of r. Noting $i_{pr0} = p^{-1} \bmod r$ and $i_{qr0} = q^{-1} \bmod r$, we make use of tricks to compute $i_{pr}$ and $i_{qr}$ from $i_{pr0}$ and $i_{qr0}$. Indeed let $p = p_0 + p_1 r \bmod r^2$ and $i_{pr1} = [-i_{pr0} p_1 - ((i_{pr0} p_0 - 1)/r)] \cdot i_{pr0} \bmod r$. Then $i_{pr} = r i_{pr1} + i_{pr0}$ (The same holds for $i_{qr}$). Thus, only two inversions modulo r are needed to compute $i_{pr}$ and $i_{qr}$. If r is for example a 32-bit value and implementation is carried out on a 32-bit chip architecture, an SPA-safe extended binary gcd algorithm can be implemented very efficiently since loops of the algorithm would be composed of comparisons, shifts, subtractions and additions on 32-bit single precision data. In this context, the execution time added by our countermeasure would be clearly less costly than Aumüller et al.'s countermeasure [4]. On smaller micro-controllers, execution time will depend on the hardware architecture, but a good approximate being that the two inversions can be considered at most as costly as two exponentiations modulo t (if $|t|=|r|$). Our proposal is therefore more efficient than Joye and Ciet's solution [6] where two extra totient calculations are needed. We can also consider that our algorithm is about as efficient as Giraud's countermeasure [7], if our exponentiation algorithm only has the property that an attacker cannot distinguish squarings from multiplications. In the case of RSA with CRT where the exponents are masked, the exponentiation algorithm could be unbalanced contrary to Montgomery-Ladder algorithm [13]. If we suppose that the modulus and the exponent are randomized by a 64-bit random integer, we perform about $$\left\lfloor \frac{|p|}{2} \right\rfloor - 96 \text{ and } \left\lfloor \frac{|q|}{2} \right\rfloor - 96$$

fewer modular multiplications for each exponentiation, but with larger operands. As an example, if the implementation is carried out on a 32-bit architecture, one Montgomery modular multiplication with two operands of length k 32-bit words, theoretically requires 2 k(k+1) single-precision multiplications. Thus, one Montgomery-Ladder exponentiation requires about 128 $k^2$(k+1) single-precision multiplications with clear data, versus 96(k+2)$^2$(k+3) for a classical exponentiation with randomized data. As a consequence for p and q greater than about 640 bits, our algorithm would be slightly more efficient than Giraud's one. Under this size, it would be the opposite.

Memory Consumption

Our countermeasure requires about as much memory as Aumüller et al.'s [4] and Joye and Ciet's implementation [6]. Obviously, it requires far less memory than Giraud's proposal [7] where memory consumption is a real disadvantage. We can consider in FIG. 3 that $\beta_p$, $\beta_q$ are not kept in RAM during the calculations of $S'_p$ and $S'_q$ since $i_{pr}$ and $i_{qr}$ can be stored on the stack. $\beta_p$ and $\beta_q$ can be calculated "on-the-fly" when needed. In the same way for the value $m_p$, only $m_p \bmod r^2$ can be stored on the stack. The instant when memory consumption is the highest occurs during the recombination (as in a classical RSA-CRT signature), except that $S'_p$, respectively $S'_q$, have length $|p|+2|r|$, and $|q|+2|r|$. The final result has length $|N|+2|r|$. Some crypto-processors are not able to perform the final verification $(S-R_4-qi_q \cdot (R_3-R_4)) \cdot N \equiv 0 \bmod Nr^2$ if N is a 2K integer, since the co-processor register size may be limited to 2K. In this case, the final verification can be replaced with $S-R_4-qi_q \cdot (R_3-R_4) \equiv 0 \bmod r^2$.

Personalization Management

The proposed implementation only requires the usual parameters needed for the computation, the input message m and the classical RSA-CRT key set $(p, q, d_p, d_q, i_q)$.

Code Size

The countermeasure is mainly based on arithmetic operations already developed for the RSA-CRT signature. Only the modular inversion, which is also based on classical arithmetic operations, should be implemented. The code of the modular inversion, is often contained in products that supply the RSA signature as they supply the RSA key generation too. Even if the code of modular inversion must be added, this leads to an acceptable code size overhead.

A Proof of Theorem 1

Claim. Let N and R be integers such that $\gcd(N, R)=1$, let $\beta=(N \cdot (N^{-1} \bmod R))$ and $\alpha=1-\beta \bmod NR$. Then $\alpha$ and $\beta$ are non zero elements verifying the following properties:
1. $\alpha^2 = \alpha \bmod NR$
2. $\beta^2 = \beta \bmod NR$
3. $\alpha\beta = 0 \bmod NR$ ($\alpha$ and $\beta$ are zero divisors in $(\mathbb{Z}_{NR}, +, \cdot)$)

Proof. This trivially comes from the definition of $\alpha$ and $\beta$.

Lemma 1. Let N and r be integers such that $\gcd(N,r)=1$, let $\beta=N \cdot (N^{-1} \bmod r^2)$ and $\alpha=1-\beta \bmod Nr^2$. Then, for any $d \in \mathbb{N}^+$ and any pair $(A, B) \in (\mathbb{Z}_{Nr^2} \times \mathbb{Z}_{Nr^2})$:

$$(\alpha A + \beta B)^d = \alpha A^d + \beta B^d \bmod Nr^2 \quad (1)$$

Proof. Let us take $R=r^2$. Since $\alpha\beta=0 \bmod Nr^2$, for any $d \in \mathbb{N}^+$ and for any $(A,B) \in (\mathbb{Z}_{Nr^2})^2$, we get:

$$(\alpha A + \beta B)^d = (\alpha A)^d + (\beta B)^d \bmod Nr^2 = \alpha A^d + \beta B^d \bmod Nr^2,$$

as $\alpha^d = \alpha$ and $\beta^d = \beta$ modulo $Nr^2$.

Lemma 2. Let N and r be coprime integers and $\beta=N \cdot (N^{-1} \bmod r^2)$. For any $d \in \mathbb{N}^+$, we have:

$$\beta \cdot (1+r)^d = \beta \cdot (1+dr) \bmod Nr^2 \quad (2)$$

Proof. Since $\beta=0 \bmod N$, the equation holds modulo N. It also holds modulo $r^2$ since $\beta=1 \bmod r^2$ and for any $d \in \mathbb{N}^+$, $(1+r)^d = 1+dr \bmod r^2$. By Chinese remaindering, the equation therefore holds modulo $Nr^2$.

Finally combining Equations (1) and (2), we get the exponentiation identity of Theorem 1, for any $m \in \mathbb{Z}_{Nr^2}$ and for any $d \in \mathbb{N}^+$:

$$(\alpha m + \beta \cdot (1+r))^d = \alpha m^d + \beta \cdot (1+dr) \bmod Nr^2$$

B Details Concerning Success Probabilities of Fault Attacks

Let us consider the fault model defined in 4.1. Assume that the attacker modifies a value A (A=B mod C') and obtains a random value $\underline{A}$ uncorrelated to A. We give here a generic expression of a success probability for passing the test A=B mod C where C is a t-bit integer. We force $2^{t-1} < \overline{C} < 2^t$, $\overline{C}=1$ mod 2. According to our recommendations in Section 3.4, r is odd, its most significant bit is one and we can deduce the same property for p. We suppose that C is uniform. We note E the event that the fault is undetected, Pr[E] the total probability of E, Pr[E|C] the probability of E assuming C, Pr[c=C] the probability of taking an element c in the considered set S such that c=C. Since the random result obtained, is uniformly distributed, we know that:

$$Pr[E \mid C] = \frac{1}{C} \quad (3)$$

We want to compute Pr[E]. Let $S=\{C \text{ s.t. } 2^{t-1} < C < 2^t \text{ and } C=1 \bmod 2\}$. From the total probability Theorem, we have:

$$Pr[E] = \sum_{C \in S} (Pr[E \mid C] \cdot Pr[c = C]) \quad (4)$$

Since C is uniform:

$$Pr[c = C] = \frac{1}{|S|} \quad (5)$$

Replacing Identities (3) and (5) in Equation (4), we get:

$$Pr[E] = \frac{1}{|S|} \cdot \sum_{C \in S} \frac{1}{C}$$

Let $\overline{S}=\{C \text{ s.t. } 2^{t-1} < C < 2^t \text{ and } C=0 \bmod 2\}$, then:

$$\sum_{C \in S \cup \overline{S}} \frac{1}{C} = [\ln C]_{2^{t-1}}^{2^t} = \ln(2^t) - \ln(2^{t-1}) = t\ln 2 - (t-1)\ln 2 = \ln 2$$

Since, $|S|=|\overline{S}|$, we may approximate:

$$Pr[E] = \frac{1}{|S|} \cdot \sum_{C \in S} \frac{1}{C} \approx \frac{1}{|S|} \cdot \frac{1}{2} \sum_{C \in \cup S} \frac{1}{C} = \frac{1}{|S|} \cdot \frac{\ln 2}{2}$$

Hence:

$$Pr[E] \approx \frac{1}{|S|} \cdot \frac{\ln 2}{2} = \frac{1}{2^{t-2}} \cdot \frac{\ln 2}{2} = 2^{-(t-2)} \ln 2$$

This explains the probability values $2^{-(|p|-1)} \ln 2$, $2^{-(|p'|-1)} \ln 2$.

Given the same C, we now assume that the attacker modifies a value A (A=B mod $C^2$) and obtains a random value $\underline{A}$ uncorrelated to A. We apply the same argument, we compute the success probability for passing the test $\underline{A}=B \bmod C^2$. In this case:

$$Pr[E \mid C] = \frac{1}{C^2} \quad (6)$$

The Identity (5) still applies here. Hence, replacing Identities (5) and (6) in Equation (4):

$$Pr[E] = \frac{1}{|S|} \cdot \sum_{C \in S} \frac{1}{C^2}$$

$$\sum_{C \in S \cup \overline{S}} \frac{1}{C^2} = \left[-\frac{1}{C}\right]_{2^{t-1}}^{2^t} = -\frac{1}{2^t} + \frac{1}{2^{t-1}} = -\frac{1}{2^t} + \frac{2}{2^t} = 2^{-t}$$

In the same way, we may approximate:

$$Pr[E] = \frac{1}{|S|} \cdot \sum_{C \in S} \frac{1}{C^2} \approx \frac{1}{|S|} \cdot \frac{1}{2} \sum_{C \in S \cup \overline{S}} \frac{1}{C^2} = \frac{1}{|S|} \cdot \frac{1}{2^{t+1}}$$

And therefore:

$$Pr[E] \approx \frac{1}{|S|} \cdot 2^{-(t+1)} = 2^{-(t-2)} \cdot 2^{-(t+1)} = 2^{-2t+1}$$

This leads to the probability value $2^{-(2|r|+1)}$.

The invention claimed is:

1. A method for securing the computation of a modular exponentiation $x=m^D$ mod N against invasive attacks, wherein m is a message, D is an exponent, and N is a modulus, comprising:
given an integer k and given an integer R such that R and N are coprime, performing the following steps:
   a. generate a mask alpha and a mask beta, such that alpha=1 mod N, alpha=0 mod R, beta=0 mod N and beta=1 mod R,
   b. mask the message m with the masks alpha and beta by computing a masked message m'=(m*alpha+k*beta) mod (N*R),
   c. compute the modular exponentiation x'=m'^D mod (N*R)
   d. if $(x'-k^D)$ mod R=O, output x=x' mod N, otherwise apply a countermeasure.

2. A method for securing the computation of a modular exponentiation $x=m^D$ mod N against invasive attacks, wherein m is a message, D is an exponent, and N is a modulus, comprising:
given an integer R such that R and N are coprime, performing the following steps:
   a. generate a mask alpha such that alpha=1 mod N and alpha=0 mod R,
   b. mask the message m with the mask alpha by computing a masked message m'=(m*alpha) mod (N*R),
   c. compute the modular exponentiation x'=m'^D mod (N*R)
   d. if x' mod R=O, output x=x' mod N, otherwise apply a countermeasure.

3. The method according to claim 1, wherein alpha is computed with the formula alpha=(1−N*((1/N) mod R)) mod (ISPR).

4. The method according to claim 1 or 3, wherein beta is computed with the formula beta=(N*((1/N) mod R)) mod (N*R).

5. The method according to claim 1, 2 or 3, wherein before and/or after carrying out the modular exponentiation x'=m'^D mod (N*R), it is verified that m=m' mod N, and if this is not the case, a countermeasure is applied.

6. The method according to claim 1, 2 or 3, wherein the countermeasure(s) comprise(s) not outputting any result for the required modular exponentiation.

7. The method according to claim 1, 2 or 3, wherein R is a random number.

8. The method according to claim 7, wherein a new random number R is generated for each modular exponentiation.

9. The method according to claim 1 or 3, wherein, given an integer i greater than 1, the number R is obtained by raising a number r to the power i, so that R=H, and wherein the integer k is set to the value k=1+r.

10. The method according to claim 1 or 3, wherein the number R and the integer k are reused for several or all modular exponentiations to be carried out by the method, and wherein the masks alpha and beta, as well as the value kD mod R, are pre-computed once for all said modular exponentiations.

11. An electronic device arranged to compute a modular exponentiation $x=m^D$ mod N, wherein m is a message, D is an exponent, and N is a modulus, to protect the modular exponentiation against invasive attacks, comprising a processor programmed to:
   a. generate a mask alpha and a mask beta, such that alpha=1 mod N, alpha=0 mod R, beta=0 mod N and beta=1 mod R,
   b. mask the message m with the masks alpha and beta by computing a masked message m'=(m*alpha+k*beta) mod (N*R),
   c. compute the modular exponentiation x'=m'^D mod (N*R)
   d. check whether $(x'-k^D)$ mod R=O, and,
      if this condition is verified, outputting x=x' mod N,
      otherwise, applying a countermeasure given an integer k and an integer R such that R and N are coprime.

12. The method according to claim 2 wherein alpha is computed with the formula alpha=(1−N*((1/N) mod R)) mod (ISPR).

* * * * *